United States Patent
Hamerton et al.

(10) Patent No.: US 10,238,083 B2
(45) Date of Patent: Mar. 26, 2019

(54) MILKING DEVICE COMPRISING A SUPPORT DEVICE

(71) Applicant: DELAVAL HOLDING AB, Tumba (SE)

(72) Inventors: Lance Hamerton, Tumba (SE); Mike Lingard, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 751 days.

(21) Appl. No.: 14/761,012

(22) PCT Filed: Jan. 28, 2014

(86) PCT No.: PCT/SE2014/050108
§ 371 (c)(1),
(2) Date: Jul. 15, 2015

(87) PCT Pub. No.: WO2014/120072
PCT Pub. Date: Aug. 7, 2014

(65) Prior Publication Data
US 2015/0351360 A1  Dec. 10, 2015

Related U.S. Application Data

(60) Provisional application No. 61/757,856, filed on Jan. 29, 2013.

(30) Foreign Application Priority Data

Jan. 29, 2013 (SE) ........................................ 1350096

(51) Int. Cl.
*A01J 5/00* (2006.01)
*A01J 5/16* (2006.01)
(Continued)

(52) U.S. Cl.
CPC . *A01J 5/16* (2013.01); *A01J 3/00* (2013.01);
*A01J 5/017* (2013.01); *A01J 5/047* (2013.01);
*A01J 7/00* (2013.01)

(58) Field of Classification Search
CPC ...... A01J 5/16; A01J 5/017; A01J 5/04; A01J 5/041; A01J 5/047; A01J 3/00; A01J 7/00
(Continued)

(56) References Cited

U.S. PATENT DOCUMENTS 3,738,321 A * 6/1973 Hicks ................. A01J 5/017
119/14.04
3,893,422 A  7/1975 Schnitzler et al.
(Continued)

FOREIGN PATENT DOCUMENTS

EP  0 008 776 A1  3/1980
EP  0 532 066 A1  3/1993
(Continued)

OTHER PUBLICATIONS

New Zealand Office Action issued in Application No. 707314, dated Apr. 18, 2017.
(Continued)

*Primary Examiner* — Monica L Williams
*Assistant Examiner* — Aaron M Rodziwicz
(74) *Attorney, Agent, or Firm* — Young & Thompson

(57) ABSTRACT

A milking device includes a support device (1) supporting a milking member (2) having a claw (3) and a number of teatcups (4) to be attached to a respective teat of an animal. The support device (1) includes a rear portion (6), an attachment part (9) attaching the support device to a structure, and an arm section (7) having a proximal end portion attached to the rear portion (6) and a distal end portion movable between an active position in the proximity of the animal to be milked and a rest position. A first cavity extends (Continued)

along the arm section and houses a retracting member for retracting the milking member from the teats of the animal. A second cavity for conveying a fluid flow extends along the arm section. The arm section includes an extruded part enclosing the first cavity and the second cavity.

20 Claims, 4 Drawing Sheets

(51) Int. Cl.
    *A01J 3/00* (2006.01)
    *A01J 5/04* (2006.01)
    *A01J 7/00* (2006.01)
    *A01J 5/017* (2006.01)

(58) Field of Classification Search
    USPC .......................................... 119/14.54, 14.55
    See application file for complete search history.

(56) References Cited

U.S. PATENT DOCUMENTS

| | | | |
|---|---|---|---|
| 4,273,070 A | 6/1981 | Hoefelmayr | |
| 5,634,428 A | 6/1997 | Koster | |
| 6,240,878 B1 | 6/2001 | Larson et al. | |
| 6,382,130 B1 * | 5/2002 | Rooney | A01J 5/00 119/14.01 |
| 6,532,893 B1 * | 3/2003 | Edholm | A01J 5/0175 119/14.47 |
| 8,146,532 B2 * | 4/2012 | Watanabe | A01J 5/0175 119/14.1 |
| 9,763,421 B2 * | 9/2017 | Torgerson | A01J 5/0075 |
| 2004/0194711 A1 * | 10/2004 | Petterson | A01J 5/0175 119/14.1 |

FOREIGN PATENT DOCUMENTS

| | | | | |
|---|---|---|---|---|
| GB | 2 307 393 A | | 5/1997 | |
| GB | 2307393 A | * | 5/1997 | ............. A01J 5/017 |
| NZ | 245355 | | 12/1993 | |
| RU | 2 423 823 C1 | | 7/2011 | |
| SU | 1113055 A | | 9/1984 | |
| SU | 1273038 A1 | | 11/1986 | |
| WO | 98/31212 A1 | | 7/1998 | |
| WO | 2009/151631 A2 | | 12/2009 | |
| WO | 2012/033448 A2 | | 3/2012 | |
| WO | WO-2012033448 A3 | * | 5/2012 | ............. A01J 5/017 |

OTHER PUBLICATIONS

Aug. 2, 2017, EP communication issued for related EP application No. 14706134.5.
International-Type Search Report, dated Jul. 17, 2013, from corresponding PCT application.
International Search Report, dated Jul. 18, 2014, from corresponding PCT application.
Supplementary International Search Report, dated Jan. 16, 2015, from corresponding PCT application.

* cited by examiner

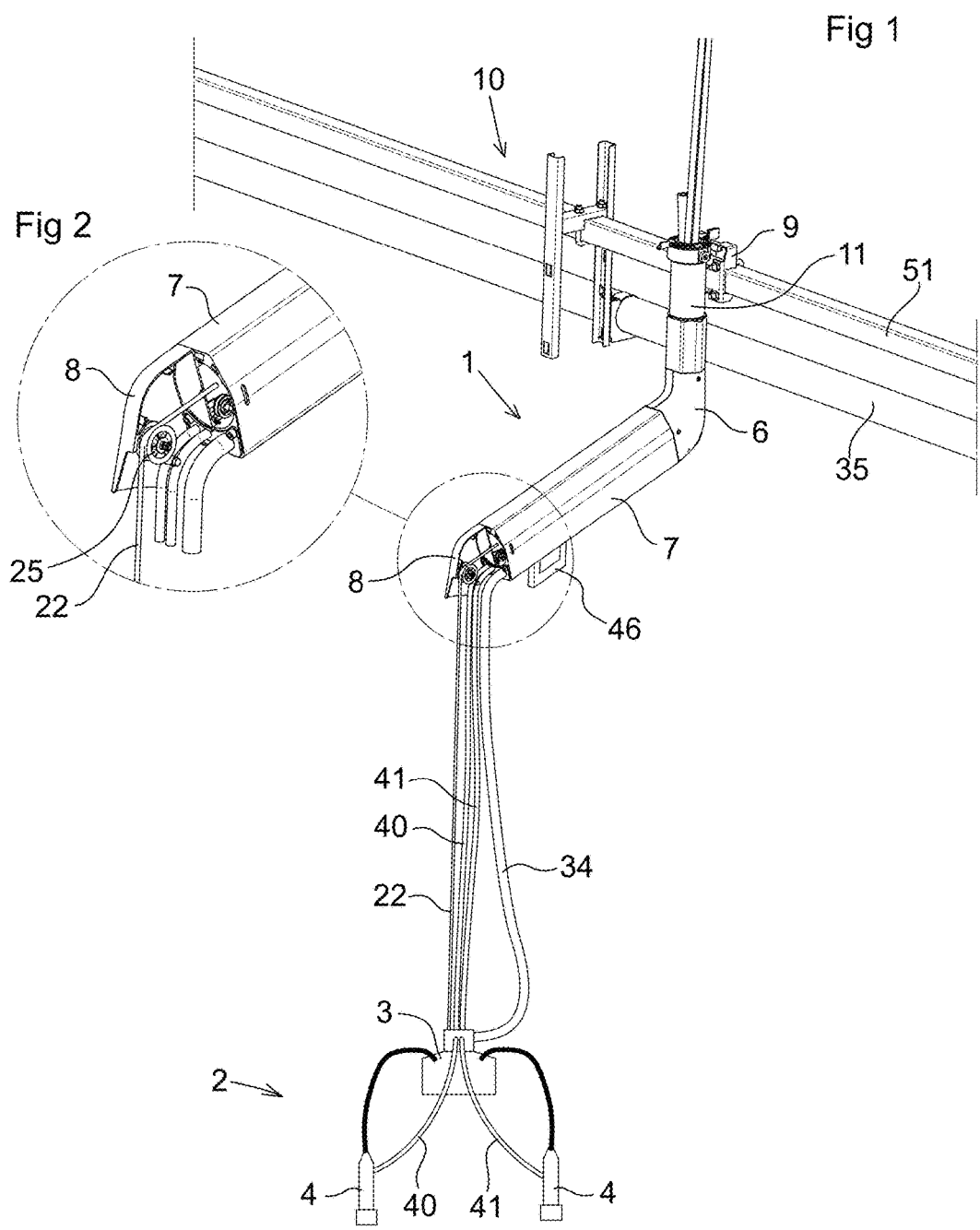

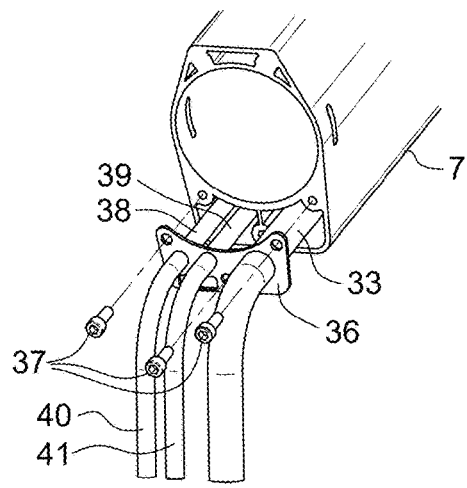
Fig 6
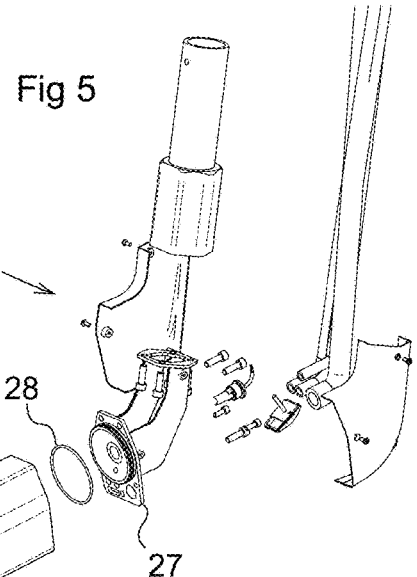
Fig 5
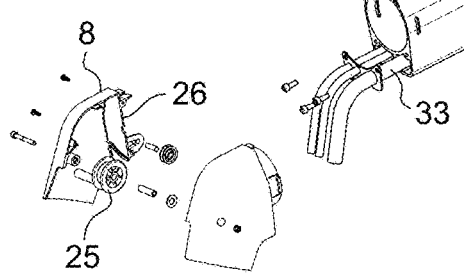
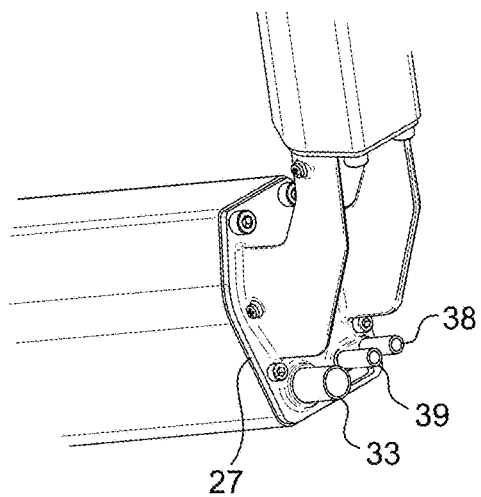
Fig 7

MILKING DEVICE COMPRISING A SUPPORT DEVICE

THE TECHNICAL FIELD OF THE INVENTION

The present invention refers to a milking device comprising a support device for supporting a milking member according to the preamble of claim 1. In particular, the support device is adapted for manual attachment of the teatcups of the milking member to the teats of the animal to be milked during a milking operation. The overall purpose of the support arm is to support and carry the milking member facilitating the manual attachment of the teatcups of the milking member to the teats of the animal. The support device according to the present invention may be semi-automatic in the sense that the removal of the milking member from the teats, when the milking operation is finished, is performed in an automatic manner by means of the retracting member.

It is known in the art of milking to provide such a support device having an elongated arm of various designs for supporting or carrying the milking member. GB-2307393, for instance, discloses a milking device comprising a support device for supporting the milking member. The support device comprises a rear portion comprising attachment means configured for permitting attachment of the support device to a structure, and an arm section extending along a longitudinal axis and having a proximal end portion and a distal end portion. The proximal end portion is attached to the rear portion. The distal end portion is configured to be movable between an active position in the proximity of the animal to be milked and a rest position. The arm section is hollow enclosing a cavity, which extends in parallel with the longitudinal axis. The hollow elongated arm section is made in stainless steel. The milking device also comprises a retracting member for retracting the milking member from the teats of the animal.

DeLaval provides a series of support devices under the trade name ML2100, configured for supporting a milking member having a claw and a number of teatcups to be attached to a respective teat of an animal to be milked during a milking operation. The support device comprises a rear portion comprising attachment means configured for permitting attachment of the support arm to a structure, and an arm section extending along a longitudinal axis and having a proximal end portion attached to the rear portion and a distal end portion configured to be movable between at least an active position in the proximity of the animal to be milked and a rest position. A first cavity extends along the arm section in parallel with the longitudinal axis and houses a retracting member for retracting the milking member from the teats of the animal. A second cavity extends along the arm section.

One problem with the support arms commonly in use today is the complexity and the great weight of the arrangement, and the various parts and components incorporated in or associated with the support arm. Frequently, external components, such as milk tubes, tubes for the gas flow providing the pulsation pressure, and retraction lines, are provided in the proximity of the support arm, which is a problem when the support arm is moved between the active position and the rest position. There is a high risk of interferences between these external components and other objects or humans in the milking area where the support arm is provided.

A further disadvantage of these external components is the difficulties to keep the support device clean. Dirt adhering to the support device is hard to remove.

The manufacturing of the support arms, being used today, is frequently inefficient. The various parts and components, to be incorporated in the support arm, require a significant and time consuming assembling.

SUMMARY OF THE INVENTION

The object of the present invention is to provide a milking device having an improved support arm. Moreover, it is aimed at a support arm that may be manufactured in an efficient manner.

The object is achieved by the milking device initially defined, which is characterized in that the arm section comprises an extruded part enclosing the first cavity and the second cavity.

Such an extruded part extending from the proximal end to the distal end may thus enclose or house important functions or components of the support device in the first and second cavities, respectively, such as the retracting member and fluid flow-conveying channels. The first cavity and the second cavity may extend along the length of the arm section through the proximal end and the distal end. The need for components mounted externally of the arm section is therefore reduced or eliminated, making the support arm less exposed to the interferences discussed above.

The manufacturing may be facilitated since the components providing the various cavities or channels may all be made in one single extrusion step of the arm section.

Since many of the functions or components of the support device are enclosed in the arm section, the support device may present a relatively even and smooth outer surface, improving the appearance of the support device and making the support device easier to keep clean.

According to an embodiment of the present invention, the first cavity is cylindrical and defined by a first inner wall surface. Such a cylindrical cavity having a cylindrical inner wall surface may facilitate the movement of a component, such as the retracting member.

According to a further embodiment of the present invention, the extruded part is made of one piece of an extrudible material. The extruded part may for instance be made of a metallic material, such as aluminium, or a suitable polymer material.

According to a further embodiment of the present invention, the first inner wall surface is formed by a surface coating. The surface coating may be applied after the extrusion in order to achieve certain properties, such as low friction for the retracting member, proper sealing between the retracting member and the inner wall surface etc.

According to a further embodiment of the present invention, the retracting member comprises a piston, which is movable in the first cavity along the longitudinal axis and which is configured to seal against the first inner wall surface. The piston may be connected to the milking member, especially the claw, by a retracting line extending in the first cavity and out through the distal end of the arm section.

According to a further embodiment of the present invention, the second cavity extends along the arm section in parallel with the longitudinal axis and is configured for permitting the transport of milk from the claw, wherein the second cavity is defined by a second inner wall surface. Such a second cavity thus enables the enclosing a fluid flow of for instance milk, pulsation pressure gas etc within the extruded part and the arm section.

According to a further embodiment of the present invention, the second inner wall surface is formed by a surface coating. The surface coating may be applied after the extrusion in order to achieve certain properties, such as protect the milk from being influence by the material of the extruded part.

According to a further embodiment of the present invention, wherein the second cavity is configured to house a milk tube. Alternatively, the second cavity may be configured to convey the milk, wherein the second inner wall surface may be configured to be in contact with the milk flowing through second cavity, and advantageously may be formed by a surface coating as discussed above.

According to a further embodiment of the present invention, the support device comprises at least one third cavity for conveying a fluid flow and extending along the arm section, wherein the third cavity is enclosed by the extruded part and defined by a third inner wall surface. Advantageously, said at least one third cavity may be configured for a gas flow providing a pulsation pressure to the teatcups.

According to a further embodiment of the present invention, the third cavity is configured to house a tube for the gas flow providing the pulsation pressure.

According to a further embodiment of the present invention, the third cavity is configured to convey the gas flow providing the pulsation pressure, wherein the third inner wall surface is configured to delimit the gas flow providing the pulsation pressure. Advantageously, the third cavity may then form two separate channels, each channel being provided for a gas flow providing a pulsation pressure to a respective one of teatcups of the milking member, or a respective pair of teatcups of the milking member.

According to a further embodiment of the present invention, the support device comprises at least one fourth cavity, extending along the arm section and being enclosed by the extruded part, wherein the fourth cavity is configured to house connection lines, for instance connection lines for communication equipment or connection lines for various actuators or operator interfaces.

According to a further embodiment of the present invention, the rear portion has an attachment portion extending along a swing axis forming an angle to the longitudinal axis, wherein the distal end portion is movable by swinging the arm section around the swing axis. Advantageously, the angle may be greater then 90°. In such a way the arm section will slope downwardly from the rear portion to a suitable height for supporting the milking member.

According to a further embodiment of the present invention, the extruded part comprises an elongated external groove enabling the attachment of auxiliary equipment to the arm section. Advantageously, such auxiliary equipment may comprise an operator interface, for instance, a signalling lamp or LED, a screen, a touch screen, buttons etc.

According to a further embodiment of the present invention, the support device comprises an operator interface configured to visualize various states of the milking operation to an operator, wherein the operator interface is provided on the rear portion. Such an operator interface may comprise at least one signalling lamp or LED visualizing for instance an ongoing milking operation, a washing operation, termination of the milking operation, etc.

According to a further embodiment of the present invention, the support device comprises a forward portion attached to the distal end portion. The forward portion may form or comprise a protection of the distal end and means for guiding tubes and lines from the arm section towards the milking member.

BRIEF DESCRIPTION OF THE DRAWINGS

The present invention is now to be explained more closely through a description of preferred embodiments and with reference to the drawings attached hereto.

FIG. 1 discloses a perspective view of a support device according to the invention, the support device being attached to a structure.

FIG. 2 discloses an enlarged view of a part of the support device in FIG. 1.

FIG. 5 discloses an exploded view of the support device in FIG. 1.

FIG. 6 shows an exploded view of a forward part of the arm section of the support device in FIG. 1.

FIG. 7 discloses a perspective view of a rear part of the support device in FIG. 1.

DETAILED DESCRIPTION OF VARIOUS EMBODIMENTS

Figure 3:
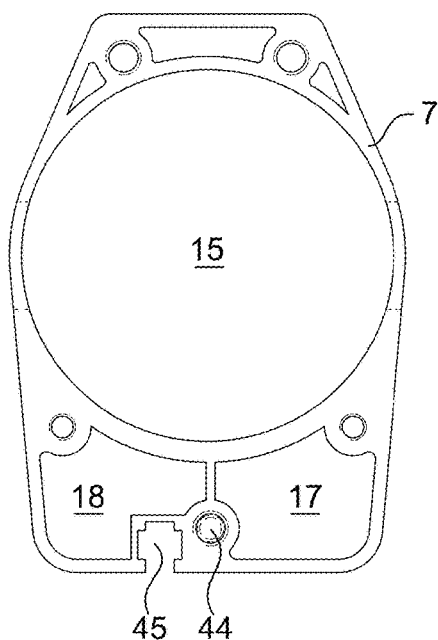
FIG. 3 discloses a cross-sectional view through an arm section of the support device in FIG. 1.

FIG. 1 discloses a milking device comprising a support device 1 supporting a milking member 2 having a claw 3 and a number of teatcups 4 to be attached to a respective teat of an animal to be milked during a milking operation. The milking member 2 may comprise four teatcups 4, for instance for milking of cows. Only two teatcups 4 are disclosed in FIG. 1. The milking member 2 may also comprise only two teatcups 4 for milking of for instance sheep or goats.

The support device 1 comprises a rear portion 6, an arm section 7 and a forward portion 8.

Figure 4:
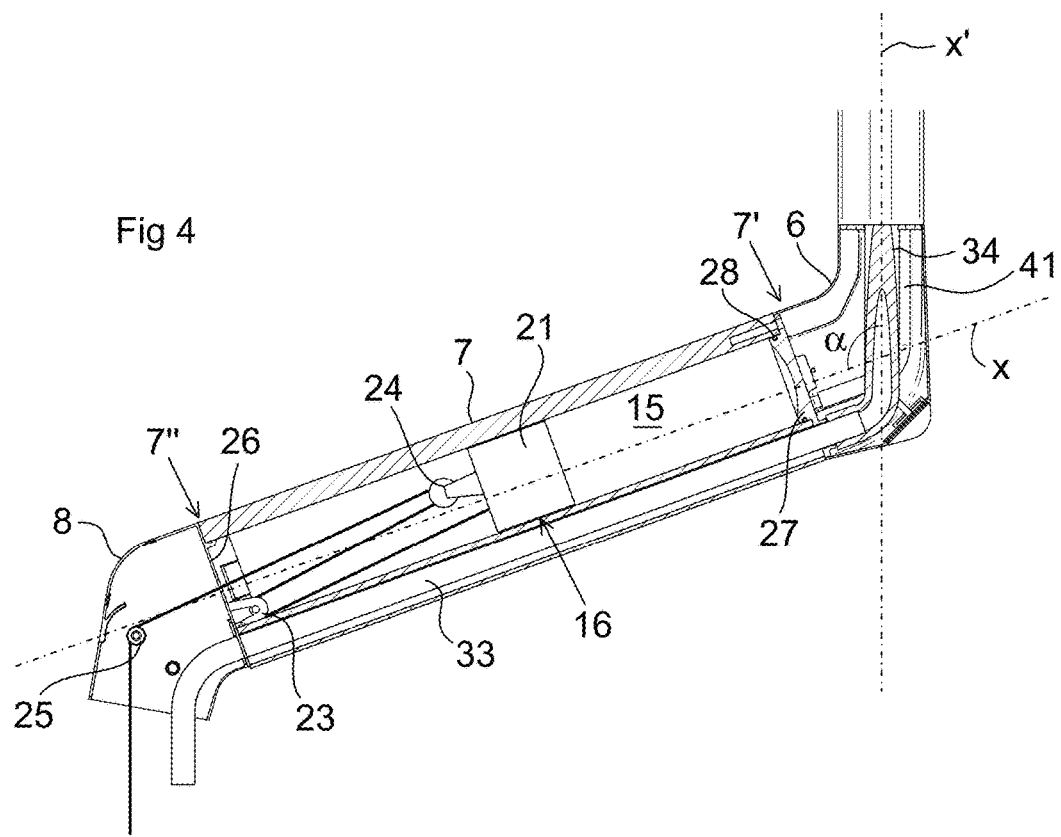
FIG. 4 discloses a longitudinal sectional view through the support device disclosed in FIG. 1.

The arm section 7 extends along a longitudinal axis x, see FIG. 4, and has a proximal end portion 7' attached to the rear portion 6 and a distal end portion 7" attached to the forward portion 8.

The rear portion 6 extends along a swing axis x', see FIG. 4, forming an angle α to the longitudinal axis x. The support device is movable in such a way that the distal end portion 7' is movable between at least an active position, in which the distal end portion 7" is in the proximity of the animal to be milked, and a rest position. This movement is achieved by swinging the arm section 7 around the swing axis x'. The angle α is greater then 90°, and preferably smaller than 150°, for instance 120° or approximately 120°. In such a way the arm section 7 will slope downwardly from the rear portion 6 to a suitable height for supporting the milking member 2.

The rear portion 6 comprises attachment means 9 enabling attachment of the support device to a structure 10, see FIG. 1. The attachment means 9 are rotatably attached to a tubular part 11 of the rear portion 6. The structure 10 may be a stationary part of a milking parlour to which connected to a milk pipeline 35 for conveying milk, and a pulsation pipeline (not disclosed) for gas or air for supplying a pulsation pressure to pulsation chambers of the teatcups 4.

The arm section 7 comprises a first cavity 15, which extends along the arm section 7 in parallel with the longitudinal axis x. the first cavity 15 houses a retracting member 16 configured for retracting the milking member 2 and the teatcups 4 from the teats of the animal.

The arm section 7 also comprises a second cavity 17, see FIG. 3, which is configured to convey a fluid flow, especially a milk flow, and which extends along the arm section 7 in parallel with the longitudinal axis x.

The arm section 7 also comprises a third cavity 18, see FIG. 3, which is configured for conveying a fluid flow, especially a gas flow, and which extends along the arm section 7 in parallel with the longitudinal axis x.

The arm section 7 comprises an extruded part or is formed by an extruded art. The extruded part encloses the first cavity 15, the second cavity 17 and the third cavity 18, see especially FIG. 3.

The arm section 7, i.e. the extruded part, is made of one piece of an extrudible material, for instance a metallic material, such as aluminium, or a suitable polymer material. The arm section 7 may thus be manufactured in an easy manner by extrusion of the material through an extrusion process resulting in an extruded object which is cut into suitable lengths.

The first cavity 15 is cylindrical, especially circular cylindrical as in the first and second embodiments. The first cavity 15 is defined by a first inner wall surface 15a. The second cavity 17 is defined by a second inner wall surface 17a. The third cavity 18 is defined by a third inner wall surface 18a.

A surface coating may be applied fully or partly to the extruded part. Especially, a surface coating may be applied to form the first inner wall surface 15a. Such a surface coating may improve wear resistance of the extruded part and reduce friction for the retracting member 16.

The retracting member 16 comprises a piston 21, which is movable in the first cavity 15 along the longitudinal axis x. The piston 21 is configured to seal against the inner wall surface 15a.

The retracting member 16 also comprises a cord 22 connected to the piston 21 and to the milking member 2, especially to the claw 3. The milking member 2 is removed from the teats and retraced by a rearward movement of the piston 21 towards the rear portion 6. The movement is transferred to the milking member 2 by the cord 22.

The cord 22 is in the embodiments disclosed wound around a first pulley 23, attached to the support device 1, around a second pulley 24, attached to the piston 21, and around a third pulley 25, attached to the support device 1. The third pulley 25 is attached to the forward portion 8

The forward portion 8 comprises a forward end wall 26 delimiting the first cavity 15 at the distal end portion 7". In the embodiments disclosed, the first pulley 23 is attached to the forward end wall 26, see FIG. 5. The rear portion 6 comprises a rear wall 27 delimiting the first cavity 15 at the proximal end portion 7'. A sealing 28 is provided between the rear wall 27 and the proximal end portion 7' of the arm section 7. A valve member 29, see FIG. 5, extends through the rear wall 27. The valve member 29 is connected to a low pressure source (not disclosed). By opening the valve member 29, the pressure in the first cavity 15 will be reduced permitting the piston 21 to be moved towards the rear wall 27, thereby retracting the milking member 2.

In the first embodiment, the second cavity 17 is configured to house a milk tube 33 for conveying a milk flow. The milk tube 33 forms a part of a long milk conduit 34 extending from the claw 3 of the milking member 2 to a milk-receiving container (not disclosed). In the embodiments disclosed, the long milk conduit 34 may be connected to the milk pipeline 35, see FIG. 1, extending along the structure 10 to the milk-receiving container.

The milk tube 33 is attached to the arm section 7 by means of a bracket 36 and a number of screws 37 engaging holes in the forward end portion 7" of the arm section 7, see FIG. 6. In the embodiments disclosed, the milk tube 33 extends through the rear wall 27, see FIG. 7.

The third cavity 18 is configured for permitting a gas flow providing a pulsation pressure to the teatcups 4. In the first embodiment, the third cavity 18 is configured to house two tubes 38, 39 for the gas flow providing the pulsation pressure. The tubes 38, 39 form parts of a respective pulsation conduit 40, 41 extending from pulsation chambers of the teatcups 4 to a pulsator (not disclosed).

Also the tubes 38, 39 for the gas flow providing the pulsation pressure may be attached to the arm section 7 by means of the bracket 36 and the screws 37. In the embodiments, disclosed the tubes 38, 39 extend through the rear wall 27, see FIG. 7.

The support device 1 also comprises a fourth cavity 44 which extends along the arm section 7 and is enclosed by the extruded part, see FIG. 3. Also the fourth cavity 44 extends in parallel with the longitudinal axis x, and may be configured to house connection lines (not disclosed), for instance electrical cables for the operation of various devices.

The arm section 7, i.e. the extruded part of the support device 1 also comprises an elongated external groove 45, which enables the attachment of auxiliary equipment to the arm section. The auxiliary equipment may comprise a display 46 having a screen for instance a touch screen or a screen with separate buttons for input of commands. The display 46 may be configured to display to an operator, for instance, the identity of the animal being milked, the states of the milking operation, the washing operation etc. The external groove 45 extends along the arm section 7 in parallel with the longitudinal axis x on a lower side of the extruded part. The external groove 45 is undercut to enable easy attachment of the auxiliary equipment.

Moreover, the support device 1 may comprises an operator interface 47 configured to visualize various states of the milking operation to an operator. The operator interface 47 is in the embodiments disclosed provided on the rear portion 6 at a rear lower end of the rear portion 6. The operator interface 47 is thus integrated in the support device 1. Alternatively, the operator interface 47 may be integrated in the arm section 7. The operator interface 47 may comprise one or more signalling lamps or one or more signalling LEDs.

Figure 8:
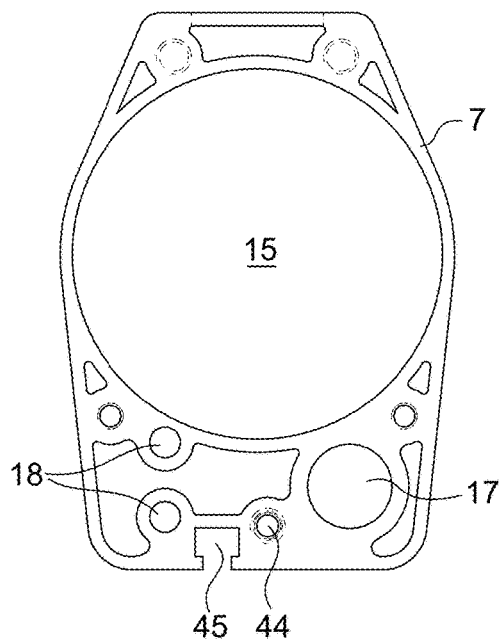
FIG. 8 discloses a cross-sectional view of an arm section of a support device according to a second embodiment of the invention.

FIG. 8 illustrates a second embodiment which differs from the first embodiment with respect to the configuration of the second cavity 17 and the third cavity 18.

The second inner wall surface 17a of the second cavity 17 is formed by a surface coating in order to enable the second cavity 17 to convey the milk flow without any milk tube so that the second inner wall surface 17a will be in contact with the milk flowing through second cavity 17. The surface coating of the second inner wall surface 17a thus have hygienic properties making it suitable for being in contact with milk. In the second embodiment the second cavity 17 has a circular cross-section.

Figure 9:
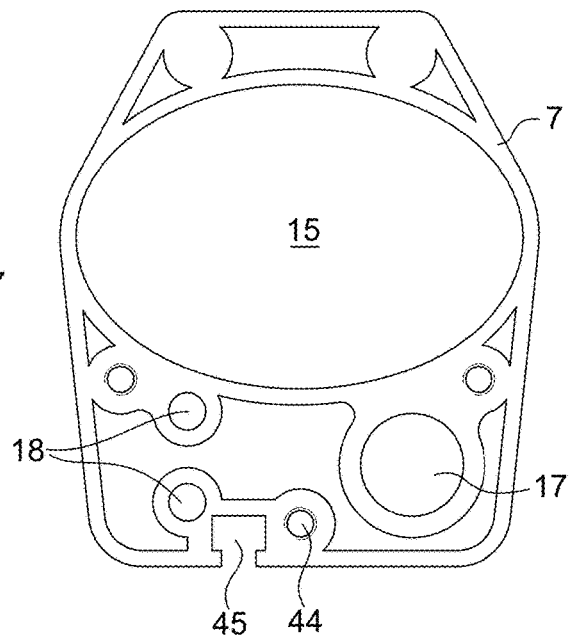
FIG. 9 discloses a cross-sectional view of an arm section of a support device according to a third embodiment of the invention.

In the second embodiment, the arm section 7, i.e. the extruded part, encloses two third cavities 18 each being configured for a gas flow providing the pulsation pressure for one or two teatcups. The two third cavities 18 are configured to convey the gas flow providing the pulsation pressure without any tubes so that the third inner wall surface 18a will delimit the gas flow. FIG. 9 discloses a third embodiment which differs from the second embodiment with respect to the first cavity 15. In the third embodiment, the first cavity 15 has another cross-sectional shape than in the first and second embodiment, namely an oval or elliptic cross-sectional shape. Still the first cavity 15 is cylindrical, but with an non-circular cross-section.

Figure 10:
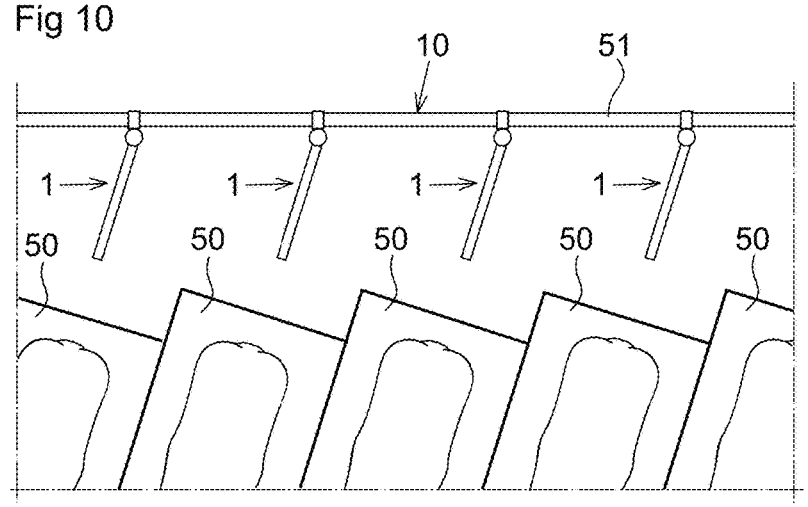
FIG. 10 discloses schematically a view from above of a milking plant layout including a number of support devices as shown in FIG. 1.

The support device 1 may be used in milking plants of many different layouts. For instance, the milking plant may comprise a row of milking boxes 50 arranged in a so called herringbone pattern, see FIG. 10. One support device 1 is provided behind each milking box 50 and attached to the structure 10 having a bar 51 extending along the row of milking boxes 50. The support device 1 is provided at a suitable height above the floor for the operator so that the support device 1 may be easily swung around the swing axis x' from the rest position to the active position facilitating the attachment of the teatcups 4 for the operator. Preferably, the height of the support device 1 is such that each operator interface 43 and each display 42 may be easily seen by the operator when walking along the row of milking boxes 50.

The present invention is not limited to the embodiments disclosed but may be varied and modified within the scope of the claims.

The invention claimed is:

1. A milking device comprising:
a support device (1) configured for supporting a milking member (2) having a claw (3) and a number of teatcups (4) to be attached to a respective teat of an animal to be milked during a milking operation, the support device comprising
an arm section (7) extending along a longitudinal axis (x) and having a proximal end portion (7') and a distal end portion (7") movable between an active position in the proximity of the animal to be milked and a rest position,
wherein the arm section (7) comprises
i) a first cavity (15), extending along the arm section along the longitudinal axis (x), the first cavity (15) being defined by a first inner wall surface (15a), and
ii) a second cavity (17) that conveys a fluid flow and extends along the arm section (7) along the longitudinal axis (x), the second cavity (17) being defined by a second inner wall surface (17a),
wherein the second cavity (17) extends along the arm section (7) along with the longitudinal axis (x) and permits transport of milk from the claw, and
wherein the arm section (7), from the proximal end portion (7') to the distal end portion (7") is an extruded part enclosing the first cavity (15) and the second cavity (17),
the milking device further comprising a retracting member (16) that retracts the milking member (2) from the teats of the animal, the retracting member (16) being enclosed within and movable within the first cavity (15) along the longitudinal axis (x) of the arm section (7), the retracting member (16) having a connecting element (22) that connects to the milking member (2);
a tubular part (11) with a length extending along a swing axis (x'), the swing axis (x') extending in a vertical direction;
an attachment part (9) that attaches the tubular part (11) to a structure (10) of a milking parlour that performs the milking operation; and
a rear portion (6) connected to a lower part of the tubular part (11) and to the proximal end portion (7') of the arm section (7), the retracting member (16) and the longitudinal axis (x) of the arm section (7) extending in a horizontal direction with the rear portion (6) forming an angle (α) between the swing axis (x') and the longitudinal axis (x) of the arm section (7), the angle (α) being greater than 90° and smaller than 150° causing the arm section (7) to slope from the rear portion (6), downwardly from the proximal end portion (7') to the distal end portion (7"), and
wherein the distal end portion (7") is movable, between the active position and the rest position, by swinging the arm section (7) around the swing axis (x').

2. The milking device according to claim 1, wherein the arm section (7) further comprises a third cavity (18) that conveys a gas flow providing a pulsation pressure to the teatcups (4), the third cavity (18) being enclosed within the extruded part and extending along the arm section (7), the third cavity (18) being defined by a third inner wall surface (18a), the third cavity (18) conveying the gas flow with the gas flow in contact with the third inner wall surface (18a).

3. The milking device according to claim 2, wherein the support device comprises a fourth cavity (44), extending along the arm section (7) and being enclosed within the extruded part.

4. The milking device according to claim 1, further comprising:
a rear portion (6) comprising an attachment part (9) attached to the proximal end portion (7') of the arm section (7), the attachment part (9) for attaching the proximal end portion (7') of the arm section (7) to a structure (10),
wherein the rear portion (6) extends along a swing axis (x') forming an angle (α) to the longitudinal axis (x), and
wherein the distal end portion (7") is movable by swinging the arm section (7) around the swing axis (x').

5. The milking device according to claim 1,
wherein the retracting member (16) comprises a piston (21) sealed against the first inner wall surface (15a), a rear side of the piston facing the proximal end portion (7') of the arm section (7), a region of the first cavity (15) between the rear side of the piston and the proximal end portion (7') being maintained under a reduced pressure such that the piston (21) is movable in the first cavity (15) along the longitudinal axis (x) toward the proximal end portion under the reduced pressure.

6. The milking device according claim 1, wherein the second cavity (17) extends along the arm section (7) along with the longitudinal axis (x) and permits transport of milk from the claw.

7. The milking device according to claim 6, further comprising a surface coating on the first inner wall surface (15a), and a surface coating on the second inner wall surface (17a).

8. The milking device according to claim 1, further comprising a milk tube (33) housed in the second cavity (17).

9. The milking device according to claim 7, wherein the second cavity (17) conveys the milk with the milk flowing through the second cavity (17) in contact with the second inner wall surface (17a).

10. The milking device according to claim 1, wherein the extruded part further comprises an enclosed third cavity (18) that conveys a fluid flow, the third cavity (18) being defined by a third inner wall surface (18a) of the extruded part.

11. The milking device according to claim 10, wherein said third cavity (18) permits a gas flow providing a pulsation pressure to the teatcups (4).

12. The milking device according to claim 11, further comprising a gas flow tube (36, 37) within the third cavity, the gas flow tube providing the gas flow for the pulsation pressure.

13. The milking device according to claim 12, wherein the third cavity (18) conveys the gas flow providing the pulsation pressure flowing through the third cavity with the gas flow in contact with the third inner wall surface (18a).

14. The milking device according to claim 9,
wherein the first inner wall surface (15a) of the first cavity (15), extending along the arm section along the longitudinal axis (x), the first cavity (15) being defined by a first inner wall surface (15a), and
arm section (7) further comprises a third cavity (18) that conveys a fluid flow, the third cavity (18) being within the extruded part and extending along the arm section (7), the third cavity (18) being defined by a third inner wall surface (18a) of the extruded part, and
wherein the third cavity (18) conveys the gas flow providing the pulsation pressure flowing through the third cavity with the gas flow in contact with the third inner wall surface (18a).

15. The milking device according to 10, wherein the support device comprises a fourth cavity (44), extending along the arm section (7) and being enclosed within the extruded part.

16. The milking device according to claim 1, wherein the extruded part comprises an elongated external groove (45) enabling attachment of auxiliary equipment to the arm section (7).

17. The milking device according to claim 1, wherein the retracting member (16) comprises a piston (21) sealed against the first inner wall surface (15a) and movable in the first cavity (15) along the longitudinal axis (x), the piston (21) retracting the milking member (2) from the teats of the animal, with i) a front side of the piston having a connecting element (22) that connects to the milking member (2) for withdrawing the milking member away from the arm section, and ii) an opposite, rear side of the piston facing the proximal end portion (7') of the arm section (7), a region of the first cavity (15) between the rear side of the piston and the proximal end portion (7') being maintained under a reduced pressure, such that the piston (21) movable in the first cavity (15) along the longitudinal axis (x) toward the proximal end portion under the reduced pressure.

18. A milking device comprising:
a support device (1) configured for supporting a milking member (2) having a claw (3) and a number of teatcups (4) to be attached to a respective teat of an animal to be milked during a milking operation, the support device comprising
an arm section (7) extending along a longitudinal axis (x) and having a proximal end portion (7') and a distal end portion (7") movable between an active position in the proximity of the animal to be milked and a rest position,
wherein the arm section (7) comprises
i) a first cavity (15), extending along the arm section along the longitudinal axis (x), the first cavity (15) being defined by a first inner wall surface (15a), and
ii) a second cavity (17) that conveys a fluid flow and extends along the arm section (7) along the longitudinal axis (x), the second cavity (17) being defined by a second inner wall surface (17a),
wherein the second cavity (17) extends along the arm section (7) along with the longitudinal axis (x) and permits transport of milk from the claw by conveying the milk with the milk flowing through the second cavity (17) in contact with the second inner wall surface (17a), and
wherein the arm section (7), from the proximal end portion (7') to the distal end portion (7") is an extruded part enclosing the first cavity (15) and the second cavity (17),
the milking device further comprising a retracting member (16) that retracts the milking member (2) from the teats of the animal, the retracting member (16) being enclosed within and movable within the first cavity (15) along the longitudinal axis (x) of the arm section (7), the retracting member (16) having a connecting element (22) that connects to the milking member (2);
a tubular part (11) with a length extending along a swing axis (x'), the swing axis (x') extending in a vertical direction;
an attachment part (9) that attaches the tubular part (11) to a structure (10) of a milking parlour that performs the milking operation; and
a rear portion (6) connected to a lower part of the tubular part (11) and to the proximal end portion (7') of the arm section (7), the retracting member (16) and the longitudinal axis (x) of the arm section (7) extending in a horizontal direction with the rear portion (6) forming an angle (α) between the swing axis (x') and the longitudinal axis (x) of the arm section (7), the angle (α) being greater than 90° and smaller than 150° causing the arm section (7) to slope from the rear portion (6), downwardly from the proximal end portion (7') to the distal end portion (7"), and
wherein the distal end portion (7") is movable, between the active position and the rest position, by swinging the arm section (7) around the swing axis (x').

19. A milking device comprising:
a support device (1) configured for supporting a milking member (2) having a claw (3) and a number of teatcups (4) to be attached to a respective teat of an animal to be milked during a milking operation, the support device comprising
an arm section (7) extending along a longitudinal axis (x) and having a proximal end portion (7') and a distal end portion (7") movable between an active position in the proximity of the animal to be milked and a rest position,
wherein the arm section (7) comprises
i) a first cavity (15), extending along the arm section along the longitudinal axis (x), the first cavity (15) being defined by a first inner wall surface (15a), and
ii) a second cavity (17) that conveys a fluid flow and extends along the arm section (7) along the longitudinal axis (x), the second cavity (17) being defined by a second inner wall surface (17a),
wherein the second cavity (17) extends along the arm section (7) along with the longitudinal axis (x) and permits transport of milk from the claw by conveying the milk with the milk flowing through the second cavity (17) in contact with the second inner wall surface (17a), and
wherein the arm section (7), from the proximal end portion (7') to the distal end portion (7") is an extruded part enclosing the first cavity (15) and the second cavity (17), the milking device further comprising a retracting member (16) that retracts the milking member (2) from the teats of the animal, the retracting member (16) being enclosed within and movable within the first cavity (15) along the longitudinal axis (x) of the arm section (7), the retracting member (16) having a connecting element (22) that connects to the milking member (2);

a tubular part (11) with a length extending along a swing axis (x'), the swing axis (x') extending in a vertical direction;

an attachment part (9) that attaches the tubular part (11) to a structure (10) of a milking parlour that performs the milking operation; and a rear portion (6) connected to a lower part of the tubular part (11) and to the proximal end portion (7') of the arm section (7), the longitudinal axis (x) of the retracting member (16) and the arm section (7) extending in a horizontal direction with the rear portion (6) forming an angle (α) between the swing axis (x') and the longitudinal axis (x) of the arm section (7), and wherein the distal end portion (7") is movable, between the active position and the rest position, by swinging the arm section (7) around the swing axis (x'); and a milk tube (33) connected to the claw (3) and enclosed within the second cavity (17), in the attachment part (9), and in the tubular part (11), wherein the milk tube (33) conveys the milk from the claw (3) through the second cavity (17), through the attachment part (9), and through the tubular part (11), wherein the first inner wall surface (15a) of the first cavity (15) is a cylindrical inner wall surface and the retracting member (16) is a piston (21) configured to seal against the cylindrical inner wall surface of the first cavity (15).

20. The milking device according to claim 19, further comprising a pulsation conduit (40, 41) extending from the teatcups (4), wherein the arm section (7) further comprises a third cavity (18), the pulsation conduit (40, 41) extending through and being enclosed with the third cavity (18), the attachment part (9), and the tubular part (11).

* * * * *